United States Patent
Lee et al.

(10) Patent No.: US 12,312,493 B2
(45) Date of Patent: May 27, 2025

(54) COATING METHOD OF LONG-CHAIN ENTANGLED PDMS GEL WITH SUSTAINABLE SELF-REPLENISHMENT OF LUBRICATING LAYER

(71) Applicant: POSTECH RESEARCH AND BUSINESS DEVELOPMENT FOUNDATION, Pohang-si (KR)

(72) Inventors: Sang Joon Lee, Pohang-si (KR); Gyu Do Park, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/400,182

(22) Filed: Dec. 29, 2023

(65) Prior Publication Data

US 2025/0051610 A1    Feb. 13, 2025

(30) Foreign Application Priority Data

Aug. 7, 2023  (KR) .................. 10-2023-0102732

(51) Int. Cl.
| | | |
|---|---|---|
| C09D 183/04 | (2006.01) | |
| C08K 3/04 | (2006.01) | |
| C09D 5/16 | (2006.01) | |
| C09D 7/63 | (2018.01) | |
| C09K 3/18 | (2006.01) | |

(52) U.S. Cl.
CPC ............ *C09D 183/04* (2013.01); *C08K 3/041* (2017.05); *C09D 5/1637* (2013.01); *C09D 7/63* (2018.01); *C09K 3/18* (2013.01); *C08K 2201/003* (2013.01); *C08K 2201/011* (2013.01)

(58) Field of Classification Search
CPC ...... C09D 183/04; C09D 7/63; C09D 5/1637; C08K 3/041; C08K 2201/003; C08K 2201/011; C09K 3/18
See application file for complete search history.

(56) References Cited

PUBLICATIONS

Gyu Do Park et al., "Superslippery Long-Chain Entangled Polydimethylsiloxane Gel with Sustainable Self-Replenishment", Adv. Eng. Mater., 25, 2201530, Dec. 9, 2022, DOI: 10.1002/adem. 202201530.

Gyu Do Park et al., "Development of CNT-deposited gel coating for drag reduction and anti-fouling performance", 2023 Korea Ocean Science and Technology Council Joint Academic Conference, May 2nd (Tuesday) ~ 4th (Thursday) Busan BEXCO.

Jin Hwan Kim et al., "Durable ice-lubricating surfaces based on polydimethylsiloxane embedded silicone oil infused silica aerogel", Applied Surface Science (2020), doi: https://doi.org/10.1016/j.apsusc. 2020.145728.

Chihiro Urata et al., "Transparent Organogel Films Showing Extremely Efficient and Durable Anti-Icing Performance", ACS Appl. Mater. Interfaces 2021, 13, 28925-28937, Jun. 14, 2021.

*Primary Examiner* — Robert S Walters, Jr.
(74) *Attorney, Agent, or Firm* — LEX IP MEISTER, PLLC

(57) ABSTRACT

The present disclosure is related to a coating method of a long-chain entangled PDMS (LEP) gel in which self-replenishment of a lubricating layer is sustainable. More specifically, it is possible to achieve excellent slippery properties, anti-fouling performance, and anti-icing performance for a long period of time due to sustainable self-replenishment performance of a surface coated with LEP gel, by forming LEP gel impregnated with a low-viscosity silicone oil as a lubricant into the surface of long-chain entangled PDMS (LEP), in which long-chain free polymers are entangled in PDMS networks.

8 Claims, 13 Drawing Sheets

[FIG. 1]
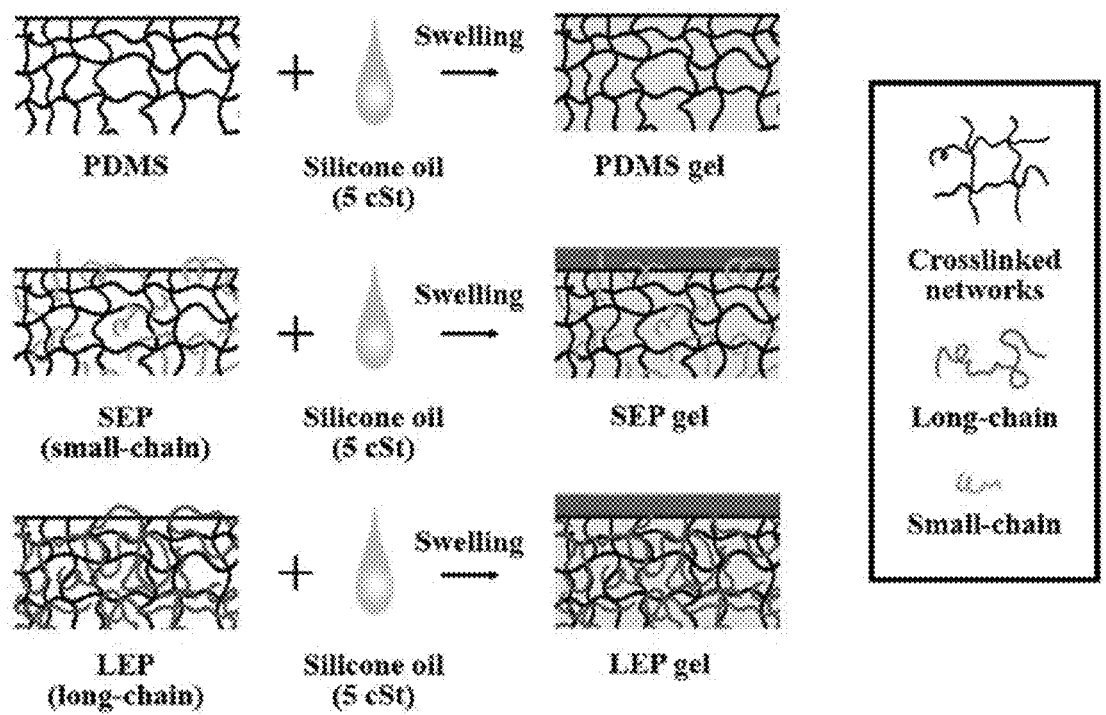

[FIG. 2]
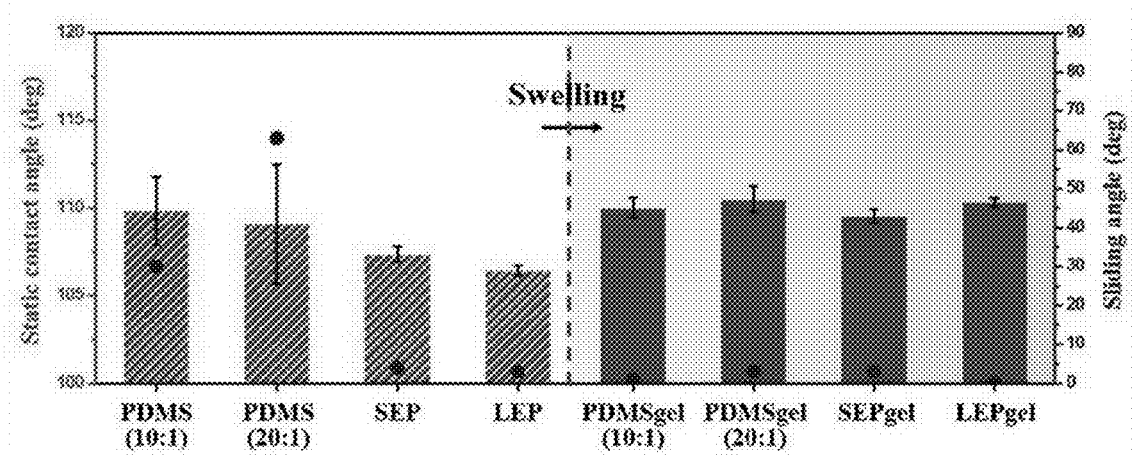

[FIG. 3]
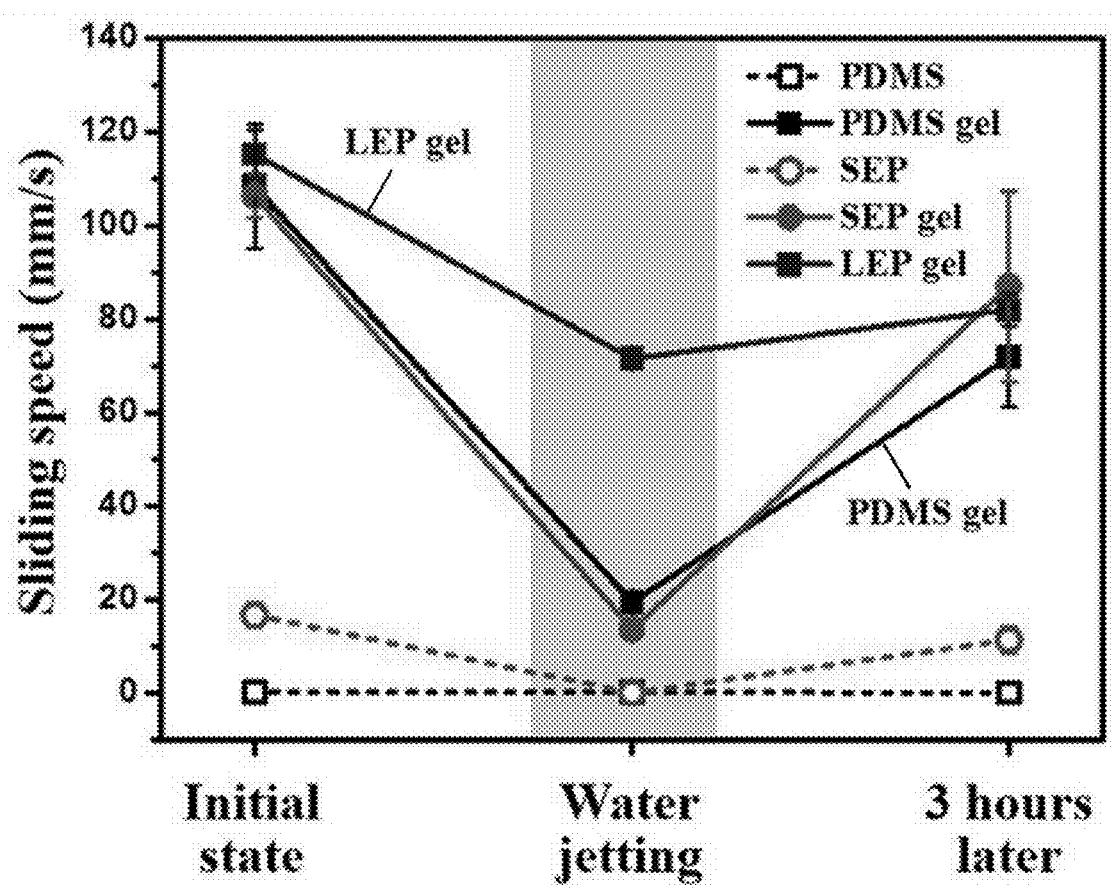

[FIG. 4]
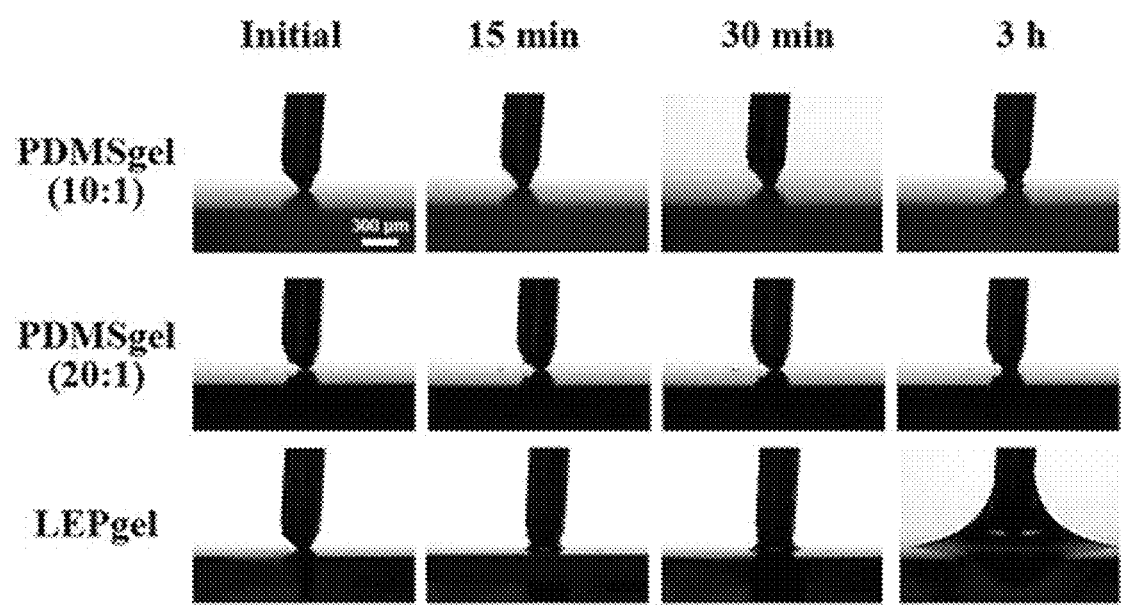

[FIG. 5]
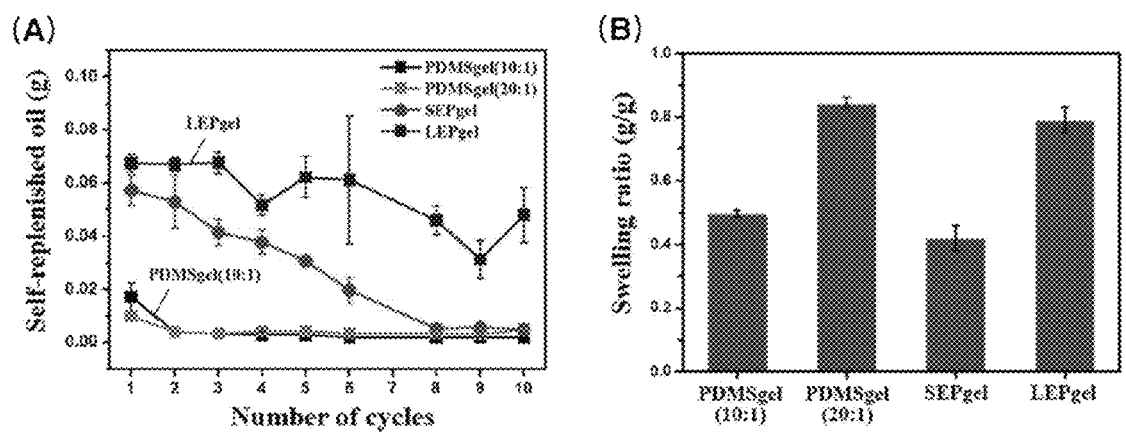

[FIG. 6]
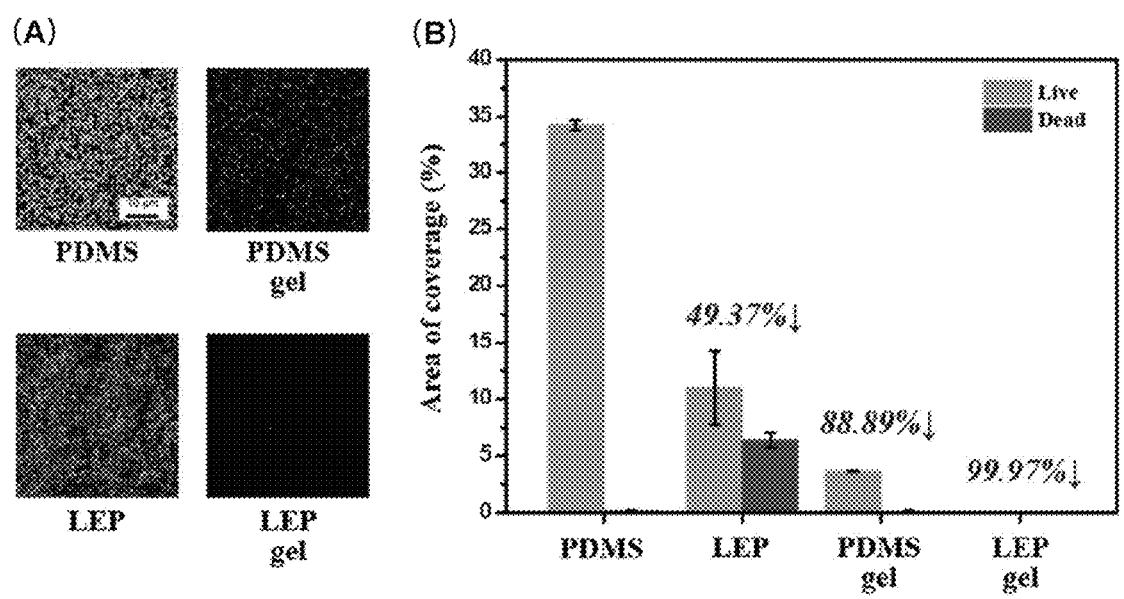

[FIG. 7A]
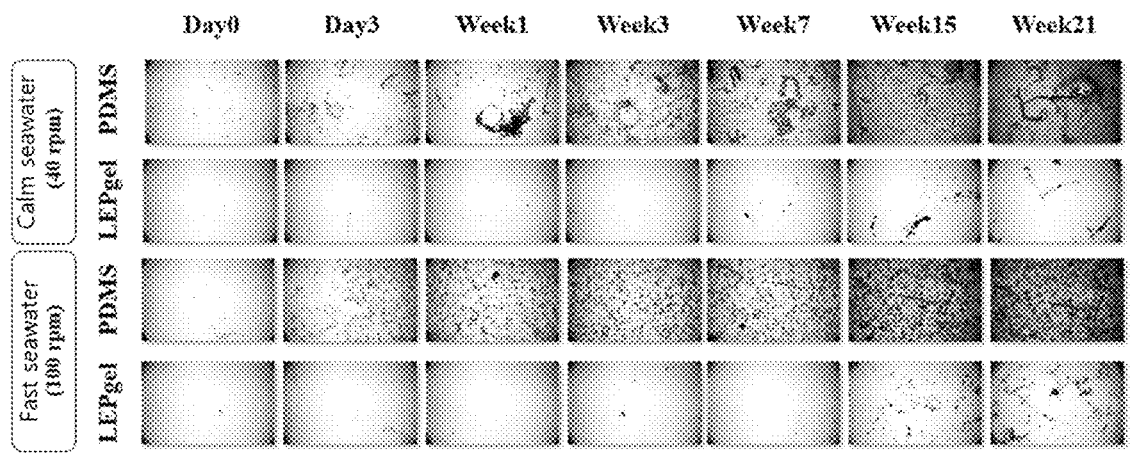

[FIG. 7B]
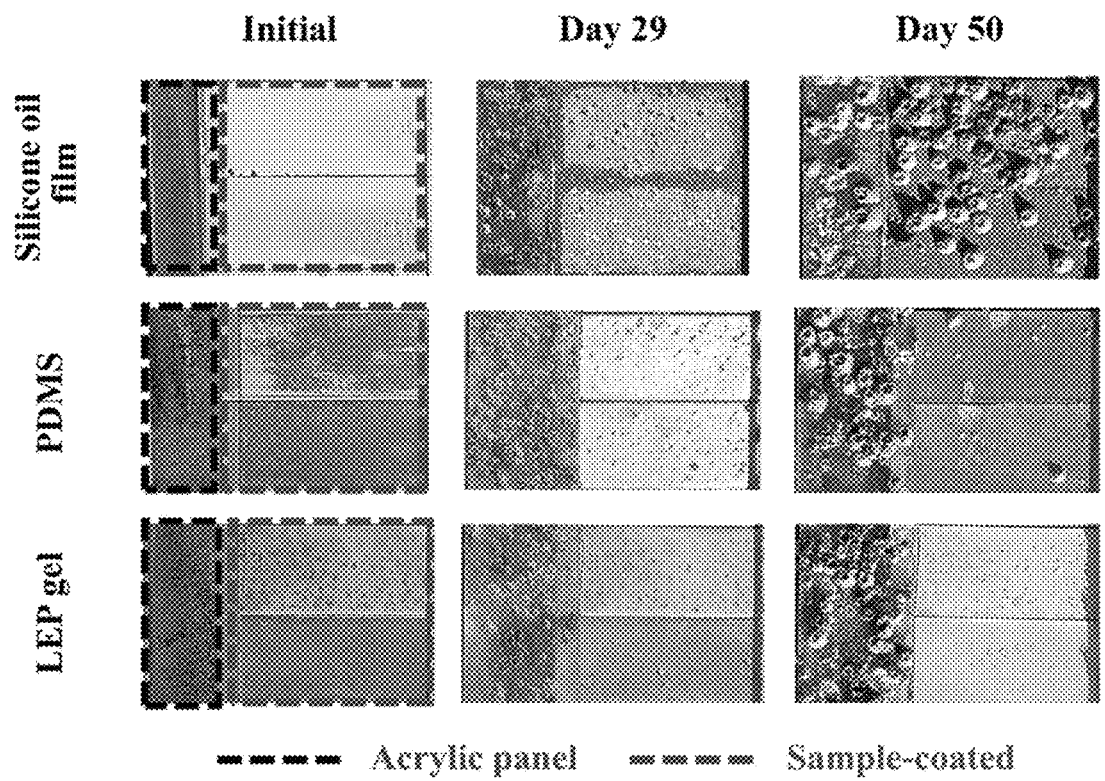

[FIG. 8]
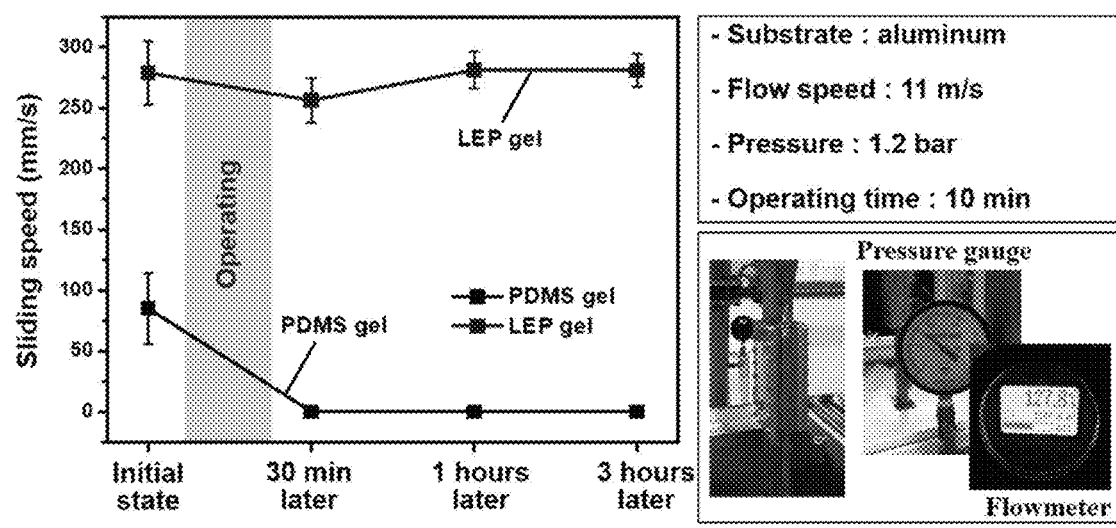

[FIG. 9]
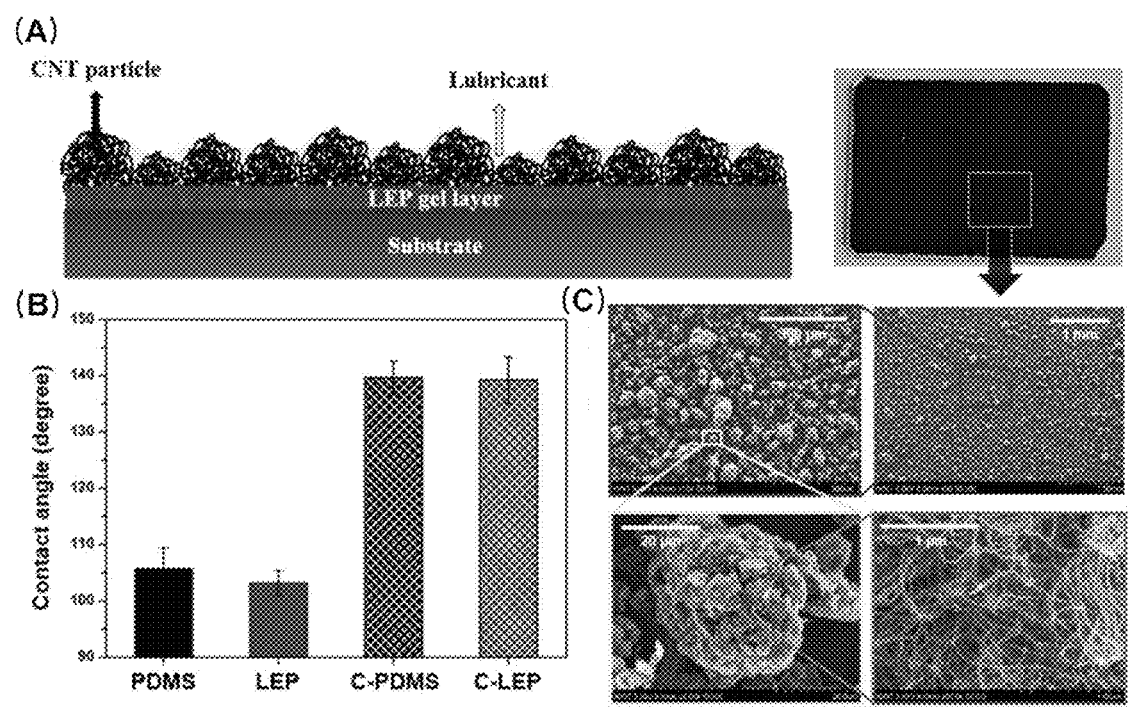

[FIG. 10]
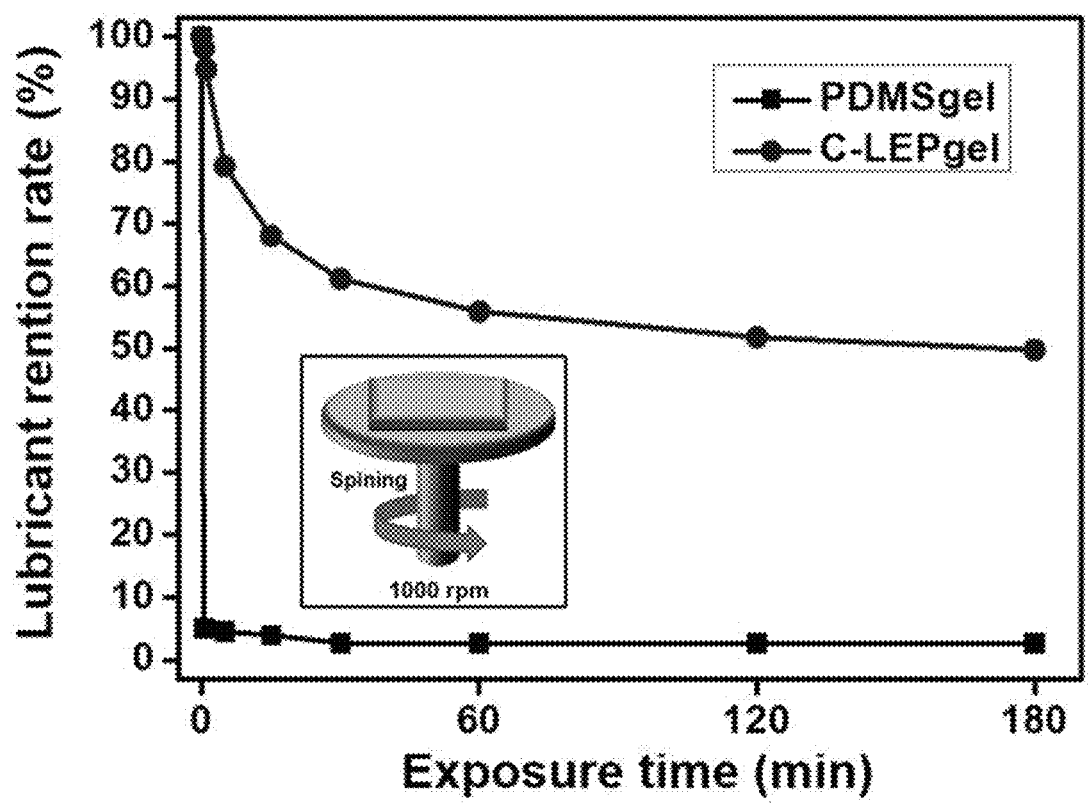

[FIG. 11A]
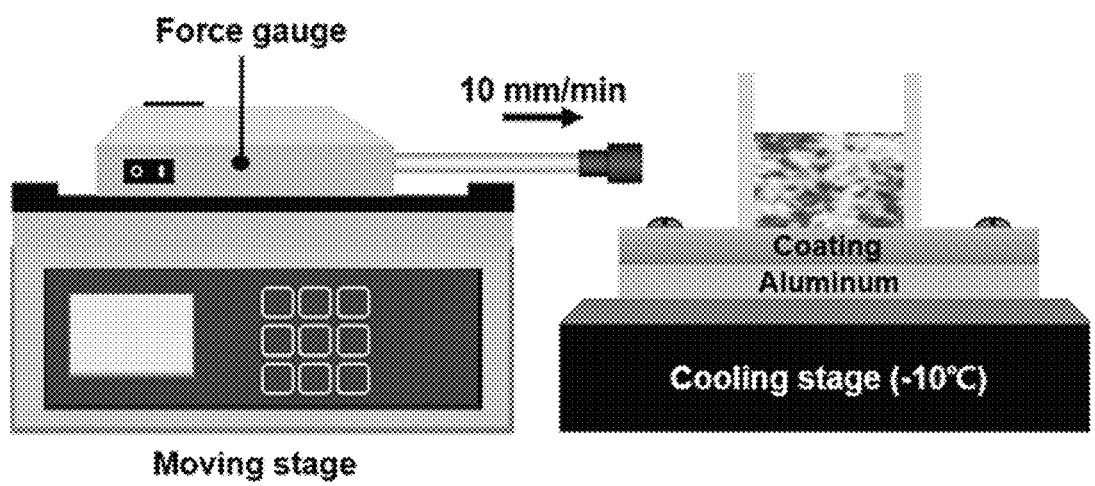
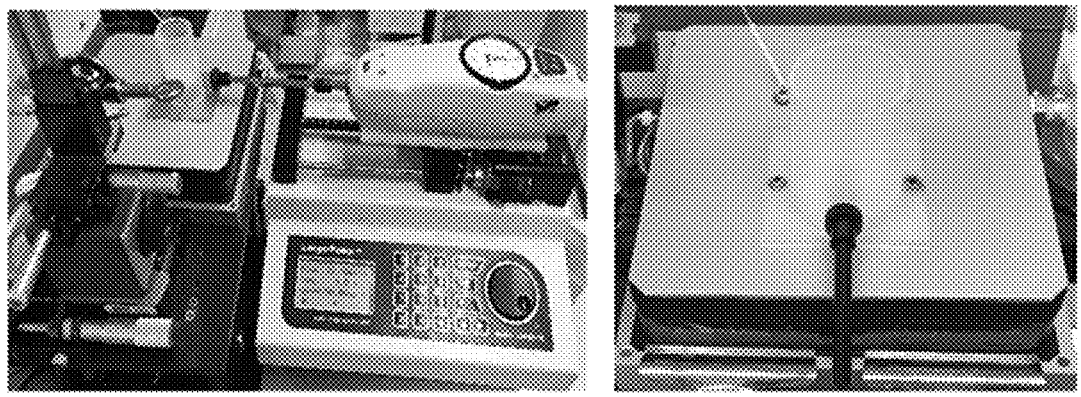

[FIG. 11B]
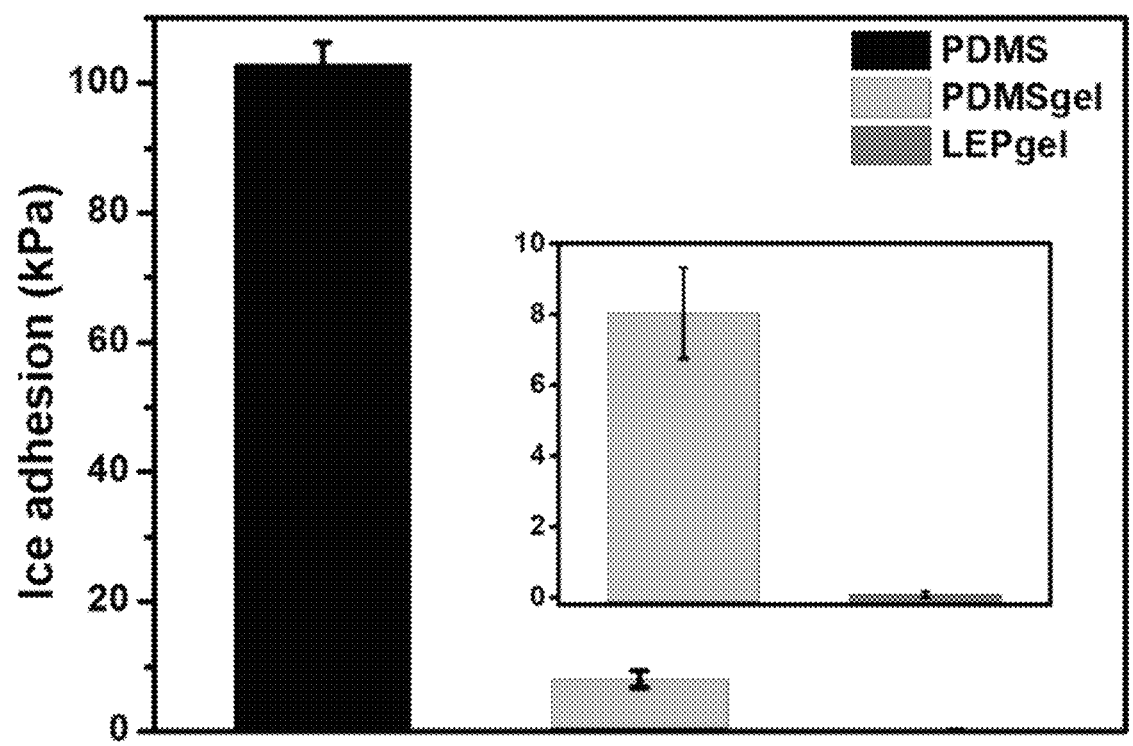

COATING METHOD OF LONG-CHAIN ENTANGLED PDMS GEL WITH SUSTAINABLE SELF-REPLENISHMENT OF LUBRICATING LAYER

CROSS-REFERENCE TO RELATED APPLICATIONS

This application is based on and claims priority from Korean Patent Application No. 10-2023-0102732, filed on Aug. 7, 2023, with the Korean Intellectual Property Office, the disclosure of which is incorporated herein with its entirety by reference.

TECHNICAL FIELD

The present disclosure relates to a method of coating a long-chain entangled PDMS gel for sustainable self-replenishment of a lubricating layer, in order to reduce surface friction and prevent surface contamination, especially biofouling.

BACKGROUND

In nature, some organisms have slippery surfaces due to formation of a lubricating layer by mucus secretion. For example, an insectivorous plant Nepenthes has a nectar layer that works as a lubricant, and thus insects sitting on the surface slide into pitcher and are digested by the plant. In addition, marine organisms, such as seaweed, puffer fish, hagfish, and eels secrete mucus from their mucous gland to reduce frictional drag and prevent surface contamination even under harsh underwater environments.

Inspired by these lubricating functions of natural organisms, various biomimetic slippery surfaces have been developed in many engineering fields, including antifouling, drag reduction, anti-icing, anticorrosion, and self-cleaning, etc.

For example, as a fundamental form of biomimetic slippery surface using lubricants, a slippery liquid-infused porous surface (SLIPS) was fabricated by injecting a viscous lubricant into a micro- or nanoscale empty space of a substrate. The lubricant impregnated in the SLIPS mostly has low surface tension and is immiscible with external working fluids. Therefore, liquid drops or solid particles do not stick to the SLIPS and slide off easily, which provide effective slippery property and anticontamination function.

However, conventional SLIPS has several disadvantages; the amount of lubricants stored in micro- or nanoscale spaces is extremely small, and the infused lubricants are easily depleted due to their outward migration or external stimuli, such as shear-induced stress. Such lubricant depletion deteriorates or even ceases the slippery function of SLIPS surfaces and thus should be solved for the practical utilization of SLIPS in real applications.

Meanwhile, unlike the conventional SLIPS in which a lubricant is infused into the voids of a solid substrate, a liquid-infused polymer surface (LIPS) is fabricated by diffusing lubricant molecules into the polymeric network of a polymer through physical and chemical interactions. Since the LIPS may store lubricants inside the polymer itself, it is flexible and has viscoelastic properties. In addition, the LIPS also has a facile fabrication process and high scalability. Thus, the LIPS has attracted considerable attention as a potential alternative to the conventional SLIPS.

The most representative LIPS is a polydimethylsiloxane (PDMS) gel in which silicone oil is absorbed into polymer networks of PDMS. The PDMS gels have been widely utilized because of their excellent physical and chemical properties, such as high elasticity, thermal and chemical resistance, and biocompatibility. Especially, PDMS and silicone oil have strong affinity, because of their chemical properties are similar, and silicone oils with a wide range of viscosity may be used without varying chemical properties.

The slippery property of the LIPS is attributed to the formation of a thin lubricating layer formed on the surface. The lubricating layer of the LIPS is formed when oil molecules stored inside the layer are released onto the surface. This self oil-releasing phenomenon of the surface is called self-replenishment or syneresis. The syneresis occurs when the amount of oil absorbed by the LIPS is over a predetermined critical value. However, if the oil content is lower than the critical amount, syneresis does not occur even though LIPS retains oil. In this case, the lubricant of the surface dries and loses its slippery function.

For PDMS gels, it is difficult to utilize the absorbed oil efficiently because the crosslinked PDMS networks strongly hold the absorbed silicone oil. According to recent studies, the PDMS gels tend not to induce syneresis as silicone oil content and viscosity decrease. In particular, when the viscosity is less than the critical value near 50 cSt, syneresis does not occur, regardless of oil content. Considering that the viscosity of the oil layer is one of the key factors that determine the slippery properties of the surface, in terms of slippery performance, it is very important to develop an LIPS that may secrete low-viscosity oil.

Therefore, the present inventors completed the present disclosure by focusing on the fact that excellent slippery properties, superior anti-fouling and anti-icing performance can be achieved for a long time due to the sustainable self-replenishment performance of the of long-chain entangled PDMS (LEP) gel surface. The LEP gel is impregnated with low-viscosity silicone oil as a lubricant. In LEP gel, long-chain free polymers are entangled in its PDMS network.

SUMMARY

The present disclosure was made in an effort to achieve excellent slippery features, anti-fouling performance, and anti-icing performance for a long time due to sustainable self-replenishment function of a LEP gel surface by forming a LEP gel with impregnating low-viscosity silicone oil as a lubricant into the surface of long-chain entangled PDMS (LEP), in which long-chain free polymers are entangled in the PDMS network.

Meanwhile, the technical objects to be achieved in the present disclosure are not limited to the aforementioned technical objects, and other technical objects, which are not mentioned above, can be apparently understood to a person having ordinary skill in the art from the following description.

An exemplary embodiment of the present disclosure provides a coating method of a long-chain entangled PDMS (LEP) gel, including (a) coating a substrate with a prepolymer mixed with high-viscosity silicone oil of 1,000 to 1,000,000 cSt, a silicone base of polydimethylsiloxane (PDMS), and a curing agent; (b) curing the substrate after step (a) to obtain LEP; and (c) immersing the substrate including the LEP into low-viscosity silicone oil of 0.1 to 30 cSt.

In step (a), the curing agent, the silicone base, and the high-viscosity silicone oil may be mixed in a weight ratio of 1:8 to 12:9 to 13.

The coating in step (a) may be performed by any one selected from the group consisting of spin coating, drop casting, dip coating, bar coating, self-assembly, spray, inkjet printing, gravure, gravure-offset, flexography, and screen-printing.

The curing in step (b) may be performed by heat treatment at a temperature in the range of 50 to 150° C.

The immersing in step (c) may be performed for 5 to 20 hours.

The substrate may be a non-metallic substrate containing at least one selected from glass, ceramic, plastic, silicon, quartz, and composites thereof; or a metal substrate containing at least one selected from aluminum, iron, copper, nickel, stainless steel, gold, silver, titanium, magnesium, and zinc.

Step (a) may further include forming a CNT structure by applying a lot of CNT particles with a diameter of 1 to 100 μm on the upper surface of the coated prepolymer layer.

The CNT particles might be porous particles in which CNT nanofibers are entangled. They may have pores of 0.1 to 500 nm in diameter.

In addition, another exemplary embodiment of the present disclosure is underwater structures coated with a LEP gel on the surface by employing the coating method according to the present disclosure, in which the underwater structure is a fixed or moving object on the surface of the water or under water.

According to the exemplary embodiment of the present disclosure, it is possible to achieve excellent slippery properties, anti-fouling performance, and anti-icing performance for a long-time due to sustainable self-replenishment performance of the LEP gel surface. The LEP gel is formed by impregnating with low-viscosity silicone oil as a lubricant into the surface, in which long-chain free polymers are entangled in the PDMS networks.

Meanwhile, the technical object to be achieved in the present disclosure is not limited to the aforementioned effects, and other not-mentioned effects will be obviously understood by those skilled in the art from the description below.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a schematic diagram of preparation of PDMS, small-chain entangled PDMS (SEP), long-chain entangled PDMS (LEP), PDMS gel, SEP gel, and LEP gel.

FIG. 2 compares static contact angles ($\theta_S$) and sliding angles ($\theta_{SL}$) of test samples before and after absorbing low-viscosity dimethyl silicone oil of 5 cSt.

FIG. 3 shows changes in sliding speed ($V_{SL}$) of a 50 μL droplet placed on test surfaces tilted at an angle of 10° before and after water jetting.

FIG. 4 is an optical image showing changes in wetting configuration at ridge area of self-replenished oil around a needle of 300 μm in diameter.

FIG. 5 shows (A) changes in the amount self-replenished oil of gel surfaces according to the number of water jetting cycles; and (B) comparison of swelling ratio(S) values of tested gel samples.

FIG. 6 is a result of analyzing antibacterial properties of test samples, (A) Confocal microscopy image, of live (green) and dead (red) cells on the surface of test samples incubated with *E. coli*; and (B) quantitative comparison of the bacterial coverage areas of the test samples.

FIG. 7A shows long-term fluorescence microscopic images (40× magnification), confirming the sustainability of antifouling performance of LEP gel in long-term (21-week) fouling organism (*Porphyridium purpureum*) culture experiment under seawater mimicking environment.

FIG. 7B shows images confirming the sustainability of antifouling performance of LEP gel in a real marine environment (Longitude 126° 32'E, Latitude 37° 14'N, the coast of Incheon, Korea). Control acrylic surfaces exhibit rapid biological (barnacle) attachment.

FIG. 8 shows a result graph showing the durability of slippery performance of LEP gel, experimental condition, and photos of high-pressure and high-speed shear flow experiments.

FIG. 9 illustrates (A) a schematic diagram showing the cross section of LEP gel incorporated with a CNT structure; (B) comparison of contact angles ($\theta_S$) of PDMS, LEP, C-PDMS and C-LEP surfaces with CNT structure formed thereon; and (c) a scanning electron microscope (SEM) images of the CNT structure formed on the LEP surface.

FIG. 10 shows lubricant retention performance of test surfaces by exposing the surfaces to a centrifugal force induced by a spin coater.

FIG. 11A is an experimental setup for evaluating the anti-icing and de-icing performance of LEP gel.

FIG. 11B compares the ice adhesion strength of LEP gel and PDMS surfaces.

DETAILED DESCRIPTION

Hereinafter, exemplary embodiments of the present disclosure will be described in detail by referring with reference to the accompanying drawings. The exemplary embodiments of the present disclosure can be modified in various forms, and it should be noted that the scope of the present disclosure is limited to exemplary embodiments to be described below. The exemplary embodiments will be provided for more complete explaining of the present disclosure to those skilled in the art. Therefore, the shapes of elements in the drawings are exaggerated to emphasize clearer explanation.

Unless otherwise specified, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Hereinafter, a coating method of a long-chain entangled PDMS (LEP) gel according to the present disclosure will be described in detail.

In the present disclosure, "long chain" may indicate a long-chain polymer, specifically a long-chain free polymer, and more specifically, long-chain silicon.

In the present disclosure, "long-chain entangled PDMS" may have a form in which the long-chain polymer, long-chain free polymer, or long-chain silicon defined above is not cross-linked but complicatedly entangled with PDMS polymer networks.

According to the present disclosure, a coating method of a LEP gel is provided, including (a) coating a substrate with a prepolymer mixed with high-viscosity silicone oil of 1,000 to 1,000,000 cSt, a silicone base of polydimethylsiloxane (PDMS), and a curing agent; (b) curing the substrate after step (a) to obtain long-chain entangled PDMS; and (c) immersing the substrate including the long-chain entangled PDMS into low-viscosity silicone oil of 0.1 to 30 cSt.

According to an exemplary embodiment of the present disclosure, the viscosity of the high-viscosity silicone oil may be 5,000 to 500,000 cSt, 5,000 to 100,000 cSt, 8,000 to 12,000 cSt, or 9,500 to 10,500 cSt. By using high-viscosity silicone oil in the viscosity range, the high-viscosity silicone oil may form a silicone free polymer which is entangled with the PDMS polymer network, rather than cross-linked in the PDMS polymer network formed by the PDMS silicone base and the curing agent. In addition, the high-viscosity silicone oil may be dimethyl silicone oil, but is not limited thereto.

According to an exemplary embodiment of the present disclosure, the viscosity of the low-viscosity silicone oil may be 0.1 to 15 cSt, 3 to 8 cSt, 4 to 7 cSt, or 4.5 to 5.5 cSt. By using the low-viscosity silicone oil in the above viscosity range, there is an additional effect of further improving the slippery performance of the surface of the LEP gel to be coated. In addition, the low-viscosity silicone oil may be dimethyl silicone oil, but is not limited thereto.

According to an exemplary embodiment of the present disclosure, the molecular weight of the high-viscosity silicone oil in step (a) may be 10,000 to 100,000; 30,000 to 80,000; 50,000 to 70,000; or 60,000 to 65,000. The high-viscosity silicone oil may be a long-chain polymer having the above molecular weight range, but is not limited thereto.

According to an exemplary embodiment of the present disclosure, in step (a), the curing agent, the silicone base, and the high-viscosity silicone oil may be mixed in a weight ratio of 1:8 to 12:9 to 13, 1:9 to 11:10 to 12, or 1:9.6 to 10.4:10.6 to 11.4. In the about weight ratio range, the high-viscosity silicone oil may form a silicone free polymer which is entangled with the PDMS polymer network, rather than cross-linked in the PDMS polymer network formed by the PDMS silicone base and the curing agent.

According to an exemplary embodiment of the present disclosure, in step (a), a removal process of bubbles in the prepolymer may be additionally performed before coating the prepolymer on the substrate. As a specific example, the removal process of bubbles may be performed by placing the prepolymer in a vacuum chamber for 10 minutes to 1 hour, 20 minutes to 40 minutes, or 25 minutes to 35 minutes, but is not limited thereto.

According to an exemplary embodiment of the present disclosure, the coating in step (a) may be performed by any one selected from the group including spin coating, drop casting, dip coating, bar coating, self-assembly, spray, inkjet printing, gravure, gravure-offset, flexography, and screen-printing, but is not limited thereto. Specifically, the coating may be commonly performed by spin coating or drop casting.

According to an exemplary embodiment of the present disclosure, the curing in step (b) may be performed by heat treatment at a temperature of 50 to 150° C., 60 to 120° C., or 70 to 90° C. Specifically, the curing may be performed for 5 to 20 hours, 8 to 15 hours, or 11 to 13 hours. When the heat treatment temperature range and the curing time range are satisfied, a gel with excellent self-replenishment (syneresis) performance may be obtained.

According to an exemplary embodiment of the present disclosure, the immersion process in step (c) may be performed for 5 to 20 hours, 8 to 15 hours, or 11 to 13 hours. When the above-described immersing time range is satisfied, a gel with excellent self-replenishment (syneresis) performance may be obtained.

According to an exemplary embodiment of the present disclosure, the substrate may be a non-metallic substrate containing at least one, selected from glass, ceramic, plastic, silicon, quartz, and composites thereof; or a metal substrate containing at least one, selected from aluminum, iron, copper, nickel, stainless steel, gold, silver, titanium, magnesium, and zinc, but is not limited thereto. Specifically, the substrate may be aluminum or slide glass. As a specific example, the composite may be a mixture of two or more materials selected from glass, ceramic, plastic, silicon, and quartz. However, additional materials may be further mixed to modify the physical or chemical properties of the substrate.

According to an exemplary embodiment of the present disclosure, step (a) may further include the formation of a CNT structure by applying a lot of CNT particles with a diameter of 1 to 100 μm on the upper surface of the coated prepolymer layer.

According to an exemplary embodiment of the present disclosure, after depositing lots of CNT particles, step (a) may further include a process of forming a CNT structure by applying pressure from the top of the deposited CNT particles toward the substrate. At this time, applying the pressure may be 20 kPa or more, 20 to 100 kPa, 20 to 60 kPa, or 20 to 40 kPa, but is not limited thereto. The deposited CNT particles may form a CNT structure which in easily attached by the viscosity of the prepolymer layer. The adhesion of the CNT structure may be further improved by applying pressure from the top of the deposited CNT particles toward the substrate. As a specific example, the process of applying the pressure may be conducted by placing a flat plate on the top of the deposited CNT particles and applying pressure toward the substrate, but is not limited thereto.

According to an exemplary embodiment of the present disclosure, the CNT particles may be at least one, selected from the group consisting of single-walled CNT (SWCNT), double-walled CNT (DWCNT), and multi-walled CNT (MWCNT). Specifically, the CNT particles may be multi-walled CNT.

According to an exemplary embodiment of the present disclosure, the CNT particles may have a diameter of 1 to 100 μm, 5 to 80 μm, 10 to 50 μm, or 10 to 30 μm. In addition, the CNT particles are porous CNT particles in which CNT nanofibers are entangled. The may have pores of 0.1 to 500 nm, 0.1 to 100 nm, 0.1 to 50 nm, 0.1 nm, or 50 nm. As described above, when the porous CNT particles have the above-described pore size range, they can maximize the ability of storing a lubricant (silicon oil) inside the polymer by improving the capillary force of the surface.

In addition, according to the present disclosure, underwater structure can be coated with a LEP gel on its surface by the coating method according to the present disclosure, in which the underwater structure is a fixed or moving object on the surface of the water or under water. The "underwater structure" may be understood as a concept that includes both mobile objects that move on the surface or underwater, such as ships or submarines, in the marine field, and fixed objects fixedly installed under water. As such, when the coating method is applied to the surfaces of ships, underwater vehicles, marine structures, etc., it may be expected to dramatically reduce operating costs, including fuel costs.

In addition, according to the present disclosure, the coating method may be used in various fields that require low friction performance, antibacterial performance, antifouling performance, and anti-icing and de-icing performance in low temperature conditions, such as land vehicle transportation, oil transportation, water treatment, and medical devices in addition to marine (underwater) vehicles.

The above description just illustrates the technical spirit of the present disclosure, and various variations and modifications may be made by those skilled in the art to which the present disclosure pertains without departing from the essential characteristic of the present disclosure. Accordingly, the various examples disclosed in the present disclosure are not intended to limit the technical spirit but describe the present disclosure and the technical spirit of the present disclosure is not limited by the following examples. The protective scope of the present disclosure should be construed based on the following claims, and all the techniques in the equivalent scope thereof should be construed as falling within the scope of the present disclosure.

Hereinafter, the present disclosure will be described in more detail through Examples.

EXAMPLES

Materials

Sylgard 184 (silicone elastomer base and curing agent) for PDMS fabrication and a DOWSIL 1200 OS primer for enhancing adhesion between a substrate and a coating were purchased from Dow Corning Co., Ltd. Dimethyl silicone solutions with different chain lengths and molecular weights were obtained from Shin-Etsu Chemical Co., Ltd.

Preparation Example 1. Preparation of Long-Chain Entangled PDMS (LEP)

A prepolymer was obtained by mixing dimethyl silicone oil (long-chain silicone polymer) with a viscosity of 10,000 cSt, a Sylgard 184 silicon base, and a Sylgard 184 curing agent evenly in a weight ratio of 11:10:1. The obtained prepolymer was left in a vacuum chamber for 30 minutes to remove bubbles generated during mixing process. Then, long-chain entangled PDMS (LEP) was fabricated by uniformly coating the bubble-removal prepolymer on the primer-coated substrate by spin coating (or drop casting) and then curing the substrate in an oven at 80° C. for 12 hours.

Example 1. Preparation of Surface Coated with Long-Chain Entangled PDMS (LEP) Gel In order to transform the LEP coating prepared in Preparation Example 1 into a slippery gel, dimethyl silicone oil with a viscosity of 5 cSt was used as a low-viscosity lubricant. The LEP was immersed in a 5 cSt oil bath for 12 hours and absorbed the oil to prepare a LEP gel-coated surface (hereinafter, referred to as a LEP gel surface). At this time, the residual oil present on the LEP gel surface which was taken out of the oil bath hindered accurate measurement of surface properties. Therefore, before the subsequent experiment, water jetting was applied to the LEP gel surface at a flow rate of 150 ml s$^{-1}$ for 60 seconds to remove the residual oil.

Example 2. Preparation of LEP Gel (C-LEP Gel) Formed with CNT Structure

A CNT structure was formed by depositing CNT particles on the LEP gel prepared in Example 1.

Specifically, a prepolymer was obtained by mixing dimethyl silicone oil (long-chain silicone polymer) with a viscosity of 10,000 cSt, a Sylgard 184 silicon base, and a Sylgard 184 curing agent evenly in a weight ratio of 11:10:1. The obtained prepolymer was left in a vacuum chamber for 30 minutes to remove bubbles generated during the mixing process. Thereafter, the CNT particles were deposited by coating the prepolymer from which the bubbles were removed to make on the primer-coated substrate evenly and flatly by spin coating (or drop casting), sufficiently covering CNT particles (MWCNT (CNT MR99)—Carbon Nanotech Co., Ltd. (carbonnano.co.kr)) on the coated prepolymer layer, and then applied pressure of about 20 kPa or more using a flat plate. Subsequently, through a curing process in an oven at 80° C. for 12 hours, the underlying LEP coating was solidified, and the CNT particles were bound to the LEP layer to fabricate C-LEP. Next, C-LEP was immersed in a 5 cSt oil bath for 12 hours and impregnated with silicone oil to prepare a C-LEP gel. At this time, the CNT particles used were porous particles in the form of entangled CNT nanofibers and had a diameter of 10 to 30 μm and a pore size of 0.1 to 50 nm.

Comparative Example 1-1. Preparation of PDMS (10:1)

A prepolymer was obtained by mixing a Sylgard 184 silicone elastomer base and a Sylgard 184 curing agent evenly in a weight ratio of 10:1. The obtained prepolymer was left in a vacuum chamber for 30 minutes to remove bubbles generated during the mixing. Thereafter, the prepolymer from which the bubbles were removed was coated evenly and flatly on the primer-coated substrate by spin coating (or drop casting) and then cured in an oven at 80° C. for 12 hours to prepare PDMS.

Comparative Example 1-2. Preparation of PDMS (10:1) Gel-Coated Surface

In order to transform the PDMS surface of the PDMS prepared in Comparative Example 1-1 into a slippery gel, dimethyl silicone oil with a viscosity of 5 cSt was used as a low-viscosity lubricant. The PDMS was immersed in a 5 cSt oil bath for 12 hours and absorbed the oil to prepare a PDMS gel-coated surface (hereinafter, referred to as a PDMS gel surface). At this time, the residual oil present on the PDMS gel surface which was taken out of the oil bath hindered accurate measurement of surface properties. Therefore, before the subsequent experiment, water jetting was applied to the gel surface at a flow rate of 150 ml s$^{-1}$ for 60 seconds to remove the residual oil.

Comparative Example 1-3. Preparation of PDMS Gel (C-PDMS Gel) Formed with CNT Structure A CNT structure was formed by depositing CNT particles on the PDMS gel prepared in Comparative Example 1-2.

Specifically, a prepolymer was obtained by mixing a Sylgard 184 silicone elastomer base and a Sylgard 184 curing agent evenly in a weight ratio of 10:1. The obtained prepolymer was left in a vacuum chamber for 30 minutes to remove bubbles generated during mixing. Thereafter, the CNT particles were laminated by coating the prepolymer from which the bubbles were removed evenly and flatly on the primer-coated substrate by spin coating (or drop casting), sufficiently covering CNT particles on the coated prepolymer layer, and then applying pressure of about 20 kPa or more evenly using a flat plate. Subsequently, through a curing process in an oven at 80° C. for 12 hours, the underlying PDMS coating was solidified, and the CNT particles were bound to the PDMS layer to fabricate C-PDMS. Next, C-PDMS was immersed in a 5 cSt oil bath for 12 hours and impregnated with oil to prepare a C-PDMS gel. At this time, the CNT particles used were porous particles in the form of entangled CNT nanofibers and had a diameter of 10 to 30 μm and a pore size of 0.1 to 50 nm.

Comparative Example 2-1. Preparation of PDMS (20:1)

PDMS was prepared in the same manner as Comparative Example 1-1, using a prepolymer obtained by mixing a Sylgard 184 silicone elastomer base and a Sylgard 184 curing agent evenly in a weight ratio of 20:1.

Comparative Example 2-2. Preparation of PDMS (20:1) Gel-Coated Surface

A PDMS gel-coated surface was prepared in the same manner as in Comparative Example 1-2, using PDMS (20:1) of Comparative Example 2-1, instead of Comparative Example 1-1.

Comparative Example 3-1. Preparation of Small-Chain Entangled PDMS (SEP)

Small-chain entangled PDMS (SEP) was prepared in the same manner as in Preparation Example 1, using a prepolymer obtained by mixing dimethyl silicone oil (small-chain silicone polymer) with a viscosity of 50 cSt, instead of dimethyl silicone oil (long-chain silicone polymer) with a viscosity of 10,000 cSt, a Sylgard 184 silicone elastomer base, and a Sylgard 184 curing agent evenly in a weight ratio of 11:10:1.

Comparative Example 3-2. Preparation of Small-Chain Entangled PDMS (SEP) Gel-Coated Surface A SEP gel-coated surface (hereinafter, referred to as a SEP gel surface) was prepared in the same manner as in Example 1, using SEP of Comparative Example 3-1, instead of LEP of Preparation Example 1.

Experimental Example

Experimental Example 1. Comparison Analysis of Surface Wettability and Slippery Performance As shown in FIG. 1, six different test samples prepared from aforementioned Examples were prepared (PDMS (Comparative Examples 1-1 and 2-1), SEP (Comparative Example 3-1), LEP (Preparation Example 1), PDMS gel (Comparative Examples 1-2 and 2-2), SEP gel (Comparative Example 3-2) and LEP gel (Example 1)). At this time, the sample that absorbed silicone oil of low viscosity of 5 cSt was named "gel". In PDMS and PDMS gel from Comparative Examples 1-1, 2-1, 1-2, and 2-2, a silicone elastomer base and a curing agent mixed at two ratios (10:1 and 20:1) were prepared. The SEP and LEP samples have free polymers that were entangled in PDMS polymeric networks rather than cross-linked. Accordingly, the SEP and LEP surfaces may have a thin lubricating layer of water-immiscible free polymer even before absorbing a low-viscosity oil. The small-chain free polymer used in SEP has a molecular weight of 3,780, which is the smallest polymer available for syneresis. The long-chain free polymer used in LEP has a molecular weight of 62 700, which has a much longer polymer chain and higher viscosity, compared to the free polymer used in SEP. Due to the considerable lengths of the polymer chains, the free polymer may be intricately entangled in the PDMS networks of the LEP, resulting in low mobility.

In the surface wettability measurement, a slide glass was used as the substrate, and 1 mL of the solution was coated on the substrate by drop casting. The wettability of the gel surfaces was measured immediately within 1 min after removing the oil layers formed on the surface with water jetting. The reasons for this procedure include the removal of residual oil from the surface and difficulty in measuring a static contact angle (θs) due to the formation of wetting ridge around a droplet in the presence of a thick oil layer.

Hereinafter, the wettability of the test sample surfaces was compared by measuring the static contact angle ($\theta_S$) and the sliding angle ($\theta_{SL}$).

Referring to FIG. 2, the contact angles $\theta_S$ of the two PDMSs (10:1 and 20:1) of Comparative Examples 1-1 and 2-1 with different curing agent ratios are 109.8° and 109.1°, respectively, which are nearly the same. However, the sliding angles $\theta_{SL}$ of the two PDMSs have different values of 30° and 63°, respectively. This is caused by the uneven surface property due to the low curing agent ratio of PDMS (20:1). On the other hand, the SEP and LEP have low sliding angles $\theta_{SL}$ of 4° and 3°, respectively, in the presence of a free polymer layer on the surface. In addition, all the gel surfaces (Comparative Examples 1-2, 2-2, and 3-2, and Example 1) that absorbed the low-viscosity silicone oil have very small $\theta_{SL}$ (<) 3°. Especially, unlike the samples before oil absorption, the contact angles $\theta_S$ of all the gel surfaces that absorbed the oil have nearly the same as about 110°. This indicates that the physicochemical properties of the oil layers on the surfaces are the same. In other words, the oil layers formed on the gel surfaces had a low viscosity of 5 cSt.

In addition, $\theta_S$ is increased in the sequence of LEP, SEP and gel surfaces. This sequence is related to surface tension. Considering that the surface tension of silicone oil decreases depending on a molecular weight and a viscosity, the $\theta_S$ values of the gels are larger than SEP. This indicates that the viscosity of the oil layer on the gel is lower than that (50 cSt) of a small-chain free polymer.

Meanwhile, a small $\theta_{SL}$ does not always guarantee the slippery property of the surface. Particularly, on the surfaces covered with a lubricating layer, it is difficult to accurately measure $\theta_{SL}$. Although LEP has a small $\theta_{SL}$ value, a droplet on the surface moves slowly due to the presence of a sticky and high-viscosity polymer layer. The movement of the droplet is almost invisible to the naked eye, and the droplet on the LEP gel surface slides easily even at 0°. Thus, it is difficult to fix the droplet to a specific location. In this respect, surfaces with high-viscosity lubricating layers have poor slippery performance even at low $\theta_{SL}$. As an additional criterion for describing slippery properties, a sliding speed ($V_{SL}$) of a droplet on the sample surface inclined at a slope angle of 10° was measured. In this kind of experiment, a wetting ridge or a clocking effect of droplet may affect the mobility of the droplet on a liquid-infused polymer surface (LIPS). To reduce this error, the droplets with a relatively large volume of 50 μL were tested in the $V_{SL}$ experiments.

Referring to FIG. 3, the droplet is fixed to the PDMS surface because the slope of the substrate is smaller than the $\theta_{SL}$ of the PDMS. On the LEP surface, the droplet moves very slowly, and the speed is close to zero compared with other sample surfaces. The $V_{SL}$ of the droplet on the SEP surface is about 16.6 mm s$^{-1}$. The increase in speed is due to the effect of the viscosity (50 cSt) of the small-chain free polymer layer. All the gel surfaces absorbing the low-viscosity oil have similar $V_{SL}$ values of about 110 mm s$^{-1}$, indicating that the gel surfaces have similar oil layer, as discussed in the wettability measurement results. In addition, to evaluate the stability of the slippery performance, the $V_{SL}$ was measured immediately after the oil layer was removed by water jetting. The droplet was fixed onto the SEP surface because the SEP surface had no lubricating layer and syneresis did not occur. The $V_{SL}$ values of the PDMS gel and the SEP gel are about 16 mm s$^{-1}$, and significantly reduced compared with their initial state. However, the LEP gel has a $V_{SL}$ value of about 71.6 mm s$^{-1}$, which is somewhat reduced compared with the initial state, indicating excellent slippery performance compared with other test surfaces. These results imply that the syneresis of the LEP gel is much faster than that in other gels, and not only the viscosity but also the oil layer thickness are important factors for determining the slippery properties of gel surfaces. Three hours after water jetting, all samples tend to be recovered from the deteriorated slippery performance due to water jetting. This effect clearly shows the occurrence of syneresis.

Experimental Example 2. Analysis of Self-Replenishment (Syneresis) on Gel Surface For confirming the syneresis phenomenon, changes in the wetting ridge formed around a vertical needle of 300 μm in diameter on the gel surface were observed over time. Immediately before the experiment, all oil layers remaining on the gel surface were removed by strong water jetting, and then started the experiment with photographing.

Referring to FIG. 4, syneresis occurs on the LEP gel over time unlike the PDMS gel. Especially, after 3 hours, the oil layer on the LEP gel is still significantly thicker. In other words, the LEP gel exhibits the fastest and thickest self-replenishment performance (that is, syneresis performance).

Experimental Example 3. Evaluation of Sustainable Self-Replenishment (Syneresis) Performance of LEP Gel Through Repetitive Experiment The sustainability of syneresis was evaluated by measuring the amount of replenished oil layer on the gel surfaces through water jetting cycle tests.

Referring to FIG. 5A, in the PDMS gels, a low degree of syneresis occurs only in the first cycle and then converges to zero in the second cycle. Actually, from the second cycle, the PDMS gel surfaces become not slippery, but they are appeared in a relatively dried state. In the first syneresis on the LEP gel and the SEP gel, the oil layers are replenished about 4.6 times compared with the PDMS gels. However, on the SEP gel, the replenished amount of the oil layers is gradually decreased as the cyclic test is repeated, and then converged to zero in the eighth cycle. The LEP gel exhibits sustainable syneresis up to over 10 cycles. These results demonstrate that the LEP gel efficiently utilizes oil stored therein to form a lubricating surface, unlike the other gels surfaces.

Meanwhile, in general, the liquid-infused polymer surface (LIPS) surfaces exhibit self-replenishment only when the amount of stored oil is larger than a critical value. When this requirement is satisfied, the high oil absorption capacities of polymer gels promote the self-replenishment of the lubricating layer and enhance the lubricant storage capacity. Thus, the absorption of low-viscosity oil in the samples of Example 1, and Comparative Examples 1-2, 2-2 and 3-4 was measured, and then the swelling ratio(S) defined as S=(W2−W1)/W1 was calculated. Here, $W_1$ is the coating weight before the absorption of low-viscosity oil, and $W_2$ is the weight of the gel after absorbing the low-viscosity oil.

Referring to FIG. 5B, the LEP gel has a high S value of about 0.8, which is much higher than the values of the SEP gel and PDMS (10:1) gel, which have S values of about 0.45. This result indicates the high lubricant storage capacity of the LEP gel. However, PDMS (20:1) gel also has a high S value. Accordingly, it implies that the outstanding self-replenishment performance of the LEP gel does not simply depend on the high oil absorption capacity.

Another strategy for inducing the self-replenishment of gels is to lower the critical amount of oil required for secretion of lubricant. The critical amount of oil may be adjusted by changing several variables, including ambient temperature, viscosity of oil, cross-linking density of a polymer, affinity between the oil and the polymer, etc. However, conventional gels immersed in an oil bath generally absorb oil in an amount close to the critical value. Therefore, the PDMS (10:1) gel and PDMS (20:1) gel of Comparative Examples 1-2 and 2-2 secrete small amounts of oil only at the beginning and eventually the secreted lubricant undergo drying on the surfaces. In contrast, the LEP gel of Example 1 exhibits sustainable self-replenishment, indicating that the critical amount of oil for lubricant secretion is continuously reduced. This unusual phenomenon may not be caused by the simple mixing between the uncross-linked long-chain free polymer and the low-viscosity silicone oil molecules inside the LEP gel, because the performance of the gel fabricated by directly mixing the long-chain polymer and low-viscosity silicone oil is poor. In other words, the outstanding self-replenishment performance of the LEP gel is caused by interactions between the entangled free polymer and low-viscosity silicone oil molecules.

Experimental Example 4. Evaluation of Resistance to Bacterial Attachment

The antibacterial performance of LEP gel was evaluated through an *E. coli* culture experiment. Specifically, after culturing *E. coli* in an incubator, the areas of bacteria attached to the sample surface were compared.

Referring to FIGS. 6A and 6B, the PDMS surface is easily contaminated with bacteria, whereas the adhesion area of the LEP surface was reduced by 49.37% compared to PDMS due to the presence of a thin free polymer layer. The bacterial adhesion was significantly reduced on the gel surface containing low-viscosity oil. In particular, the LEP gel exhibits a bacteria reduction rate of 99.97% compared to PDMS, indicating that no bacteria were practically detected. This excellent antibacterial performance of the LEP gel is caused by the low-viscosity oil layer formed on the surface.

Experimental Example 5. Evaluation of Sustainability of Antifouling Performance of LEP Gel Through Long-Term Fouling Organism (*Porphyridium Purpureum* and Barnacle) Culture Experiment To evaluate the sustainability and practicality of the antifouling performance of the LEP gel, a long-term fouling experiment was conducted in a system simulating a real marine environment. The salinity was adjusted as 3.5%, the same as actual seawater, and *Porphyridium purpureum*, a marine red algae with very strong fouling property, was used as a model organism. The flow rate of seawater was implemented with a stirrer, and the calm flow condition was implemented at a stirrer rotation speed of 40 rpm, and a fast flow condition was implemented as 100 rpm.

Referring to FIG. 7A, the PDMS surface is immediately contaminated with *Porphyridium purpureum* colonies, whereas the LEP gel coating maintains a clean surface without forming colonies even after 21 weeks. In particular, for the LEP gel coating, a phenomenon in which stains are appeared in the middle and then disappeared again. This indicates that the LEP gel coating continuously replenished the oil layer, so that organisms and organic substances could not attach and they were washed away by current flow.

Next, the sustainability of the antifouling performance of LEP gel was evaluated in an actual marine environment (Seonjaedo Island, Incheon, Korea) inhabited by barnacle with strong fouling property.

Referring to FIG. 7B, for a silicone oil film, surface contamination is less than that of an acrylic panel until 29 days, but on day 50, many barnacle, are colonized due to loss of the oil layer. for the case of PDMS coating, a clean surface is maintained until 29 days, but thereafter barnacle attachment starts However, the LEP gel coating maintains the initial surface condition without any barnacle attachment for 50 days.

FIGS. 7A and 7B confirm that the sustainability of antifouling performance of the LEP gel coating according to the present disclosure is excellent.

Experimental Example 6. Evaluation of Durability of Slippery Performance to High-Pressure and High-Speed Shear Flow To evaluate the durability of the LEP gel coating, test sample surfaces were exposed to a high-pressure shear flow at a flow speed of 11 m/s under 1.2 bar, and then changes in the coating surface and the slippery property were checked.

Referring to FIG. 8, even though the specimen was exposed to a strong shear flow, the LEP gel was not damaged at all and the slippery properties were maintained without any noticeable changes. In contrast, the PDMS gel completely lose the slippery property after being exposed to the same shear flow and the slippery property did not recover over time. This indicates that syneresis does not occur in the PEMS gel and the stored oil is depleted to a level below the critical amount. The gel sample used in this experiment was coated with a spin coater to have a very thin thickness of about 80 μm. As the coating thickness decreases, the thickness of the oil layer formed by syneresis is also decreased. Especially, when the thickness of the oil layer is 20 nm or less, the slippery property might be almost lost. For this reason, one of the reasons for the deteriorated performance of the PDMS gel is caused by the thin coating thickness. Considering that most industries prefer thin coatings, the fact that the developed LEP gel has excellent performance even at a thin thickness may be very advantageous in terms of practicality.

Experimental Example 7. Evaluation of Durability of Slippery Performance to High-Pressure and High-Speed Shear Flow The surface of the LEP (C-LEP) incorporated with the CNT structure prepared in Example 2 was observed through a scanning electron microscope.

Referring to FIGS. 9A and 9C, CNT particles of about 10 to 30 μm in size were deposited on the gel surface. Individual CNT particles are entangled with nanofibers to have nano-sized gaps, thereby maximizing the capillary force. The CNT particles are observed to be well attached without damage even when the surface was exposed to a high-speed and high-pressure flow of 10 m/s and 2 bar for a long period of time.

Referring to FIG. 9B, CNT particles are observed to have hydrophobic and lipophilic properties ($\theta_S \approx 140°$), advantage for being well impregnated with an oil layer.

Experimental Example 8. Evaluation of Oil Retention Performance of LEP Gel Through Centrifugal Force Exposure Experiment Using Spin Coater The LEP gel (C-LEP gel) with the CNT structure prepared in Example 2 was attached to a spin coater and then applied with a strong centrifugal force of 1000 rpm was applied to evaluate its lubricant retention performance.

Referring to FIG. 10, for the flat PDMS gel, most of the oil layer formed on the surface was immediately lost after exposure to centrifugal force. In contrast, the oil layer on the LEP gel surface deposited with CNT decreased relatively slowly over time and then converged to a specific value. After continued exposure to centrifugal force for 3 hours, the LEP gel with the CNT structure still retained about 50% of the oil compared to the initial oil amount. Compared to the performance of PDMS gel in which about 98% of the oil is immediately lost, the lubricant retention performance of the LEP gel is significantly improved due to the microstructure of the surface.

Experimental Example 9. Evaluation of Anti-Icing and De-Icing Performance of LEP Gel To evaluate the anti-icing and de-icing performance of the LEP gel, the adhesion (Tice) of ice pillars formed on the surface was measured. This experiment was conducted under a conditions of 60% relative humidity and temperature of 26° C. First, an acrylic cylinder with an inner diameter of 36 mm was located on the coating surface, and then 10 mL of deionized water was filled into the cylinder and frozen for 12 hours or more. The coating surface above which an ice pillar attached was fixed on a cooling stage maintaining a temperature of −10° C., and then the adhesion force Tice was measured using a force gauge. The force gauge pushed the ice pillar at a speed of 10 mm/min, and the force at the moment the ice pillar detached from the surface was defined as Tice (see FIG. 11A).

Referring to FIG. 11B, the ice formed on the surface of the LEP gel has a very low ice adhesion force of 0.09 kPa. Such adhesion close to zero is caused by the thick oil layer that exists between the ice pillar and the coating interface. Accordingly, ice formed on the slippery surface of an object may be easily removed by natural forces such as wind or gravity without supplying external energy. Furthermore, unlike conventional gel surfaces, where ice adhesion increases over time due to loss of lubricant, the LEP gel, which is capable of self-replenishing the lubricating layer, is expected to maintain low ice adhesion for a long period of time even though the ice removal process is repeated.

The foregoing detailed description illustrates the present disclosure. Furthermore, the aforementioned contents show and describe the preferred example of the present disclosure, and the present disclosure may be utilized in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing example describes the best state for implementing the technical spirit of the present disclosure, and various changes required in specific applications and uses of the present disclosure are possible. Accordingly, the detailed description of the invention above is not intended to limit the invention to the disclosed exemplary embodiment.

What is claimed is:

1. A coating method of a long-chain entangled PDMS (LEP) gel comprising:
   (a) coating a substrate with a prepolymer mixed with high-viscosity silicone oil of 1,000 to 1,000,000 cSt, a silicone base of polydimethylsiloxane (PDMS), and a curing agent;
   (b) curing the coating after step (a) to obtain long-chain entangled PDMS; and
   (c) immersing the substrate with the long-chain entangled PDMS into low-viscosity silicone oil of 0.1 to 30 cSt.

2. The coating method of the LEP gel of claim 1, wherein in step (a), the curing agent, the silicone base, and the high-viscosity silicone oil are mixed in a weight ratio of 1:8 to 12:9 to 13.

3. The coating method of the LEP gel of claim 1, wherein the coating in step (a) is performed by any one selected from the group consisting of spin coating, drop casting, dip coating, bar coating, self-assembly, spray, inkjet printing, gravure, gravure-offset, flexography, and screen-printing.

4. The coating method of the LEP gel of claim 1, wherein the curing in step (b) is performed by heat treatment at a temperature of 50 to 150° C.

5. The coating method of LEP gel of claim 1, wherein the immersing in step (c) is performed for 5 to 20 hours.

6. The coating method of the LEP gel of claim 1, wherein the substrate is a non-metallic substrate containing at least one selected from glass, ceramic, plastic, silicon, quartz, and composites thereof; or a metal substrate containing at least one selected from aluminum, iron, copper, nickel, stainless steel, gold, silver, titanium, magnesium, and zinc.

7. The coating method of the LEP gel of claim 1, wherein step (a) further comprises deposition of a carbon nanotube (CNT) structure by applying CNT particles with a diameter of 1 to 100 μm on the upper surface of the coated substrate.

8. The coating method of LEP gel of claim 7, wherein the CNT particles are porous CNT particles in which CNT nanofibers are entangled, and have pores of 0.1 to 500 nm.

* * * * *